United States Patent
Dore et al.

(10) Patent No.: US 9,137,682 B2
(45) Date of Patent: Sep. 15, 2015

(54) METHOD FOR EVALUATING LOCATIONS OF WIRELESS ACCESS POINTS IN AN HYBRID NETWORK

(75) Inventors: Renaud Dore, Rennes (FR); Charline Taibi, Chartres de Bretagne (FR); Patrick Fontaine, Rennes (FR)

(73) Assignee: Thomson Licensing, Issy les Moulineaux (FR)

(*) Notice: Subject to any disclaimer, the term of this patent is extended or adjusted under 35 U.S.C. 154(b) by 147 days.

(21) Appl. No.: 13/808,626

(22) PCT Filed: Jul. 7, 2011

(86) PCT No.: PCT/EP2011/061548
§ 371 (c)(1),
(2), (4) Date: Jan. 7, 2013

(87) PCT Pub. No.: WO2012/004361
PCT Pub. Date: Jan. 12, 2012

(65) Prior Publication Data
US 2013/0115890 A1    May 9, 2013

(30) Foreign Application Priority Data
Jul. 7, 2010 (EP) ...................................... 10305757

(51) Int. Cl.
*H04B 17/00* (2015.01)
*H04W 24/00* (2009.01)
(Continued)

(52) U.S. Cl.
CPC ............. *H04W 24/00* (2013.01); *G01S 5/0236* (2013.01); *G01S 5/0242* (2013.01); *G01S 5/0289* (2013.01); *G01S 5/14* (2013.01); *H04W 64/003* (2013.01); *H04W 24/02* (2013.01)

(58) Field of Classification Search
CPC ... G01S 5/0236; G01S 5/0242; G01S 5/0289; G01S 5/14; H04W 24/00; H04W 24/02; H04W 64/003
See application file for complete search history.

(56) References Cited

U.S. PATENT DOCUMENTS

| 5,633,888 | A | 5/1997 | Stewart |
| 5,802,473 | A * | 9/1998 | Rutledge et al. ............. 455/446 |

(Continued)

FOREIGN PATENT DOCUMENTS

| EP | 2157808 A1 | 2/2010 |
| WO | WO02080597 | 10/2002 |

OTHER PUBLICATIONS

Wang et al. Topology Identification of Power Network Based on Incidence Matrix. Power System Technology. vol. 25 (2). Feb. 2001.

(Continued)

*Primary Examiner* — Edward Urban
*Assistant Examiner* — Mohammed Rachedine
(74) *Attorney, Agent, or Firm* — Robert D. Shedd; Jerome G. Schaefer

(57) ABSTRACT

A method for evaluating connectivity in an hybrid network is disclosed. The hybrid network comprising n wireless access points, the method comprises a step of elaborating an indirect connectivity matrix having a dimension equal to n×n, wherein an element being located at row i and line j of the indirect connectivity matrix corresponds to a direct or an indirect path between a first access point i and a second access point j, A signal sent from a first access point i to a second access point j on an indirect path is successively: received and re-sent by at least a third access point k. The matrix being remarkable in that the level of received signals between each access point is greater than a second level. The method further comprises a step of elaborating a direct connectivity matrix having a dimension equal to n×n, wherein an element being located at row i and line j of the direct connectivity matrix corresponds to a direct path between a first access point i and a second access point j wherein the level of received signal is greater than a first level.
A station configured for evaluating connectivity in an hybrid network is further disclosed.

10 Claims, 4 Drawing Sheets

(51) Int. Cl.
*G01S 5/02* (2010.01)
*G01S 5/14* (2006.01)
*H04W 64/00* (2009.01)
*H04W 24/02* (2009.01)

(56) References Cited

U.S. PATENT DOCUMENTS

| | | | |
|---|---|---|---|
| 6,836,660 B1* | 12/2004 | Wala | 455/434 |
| 8,588,759 B2* | 11/2013 | Moe et al. | 455/422.1 |
| 2002/0101843 A1* | 8/2002 | Sheng et al. | 370/338 |
| 2004/0038677 A1* | 2/2004 | Avery | 455/422.1 |
| 2007/0081503 A1 | 4/2007 | Mower | |
| 2008/0112699 A1 | 5/2008 | Huseth et al. | |
| 2010/0017247 A1 | 1/2010 | Liu et al. | |
| 2010/0159936 A1* | 6/2010 | Brisebois et al. | 455/450 |

OTHER PUBLICATIONS

Rodrigues et al. On the Design and Capacity Planning of a Wireless Local Area Network. 2000 IEEE/IFIP Network Operations and Management Symposium 'The Networked Planet: Management Beyond 2000', NOMS 2000.

* cited by examiner

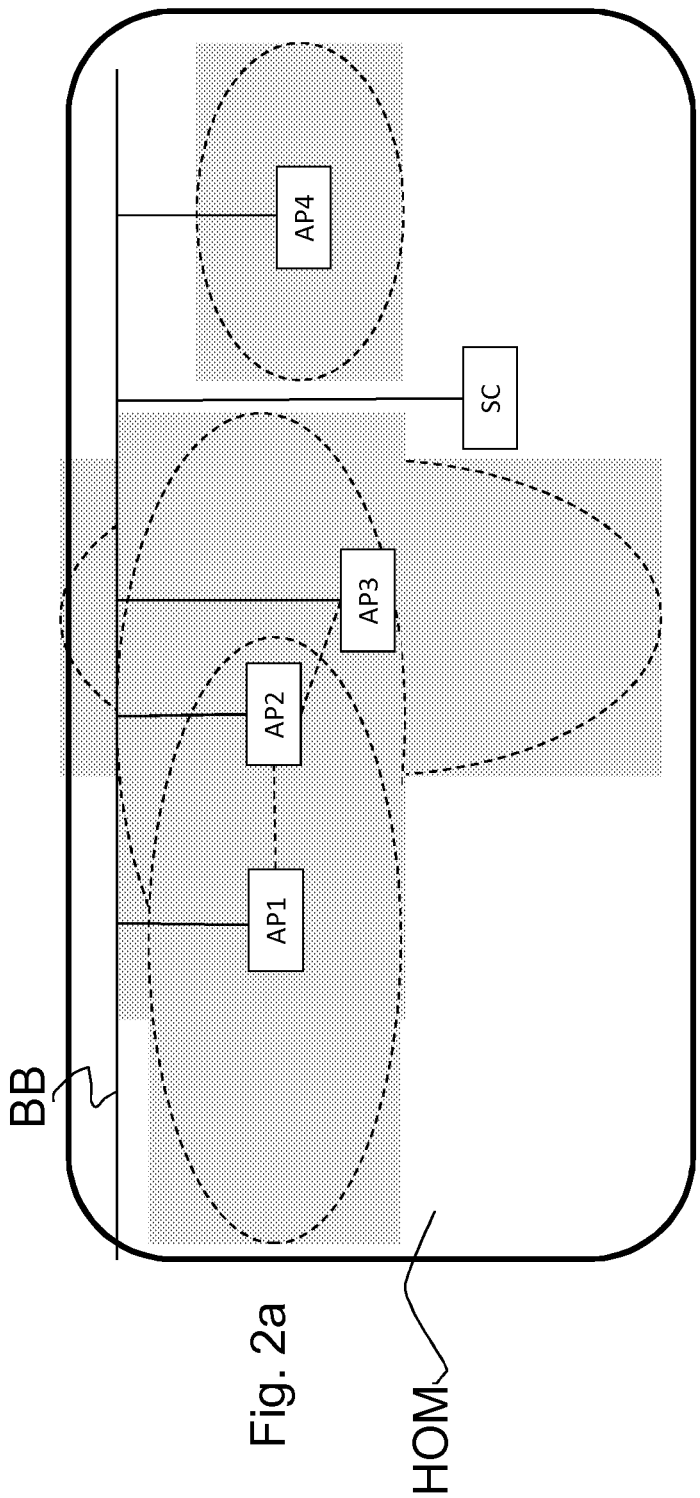
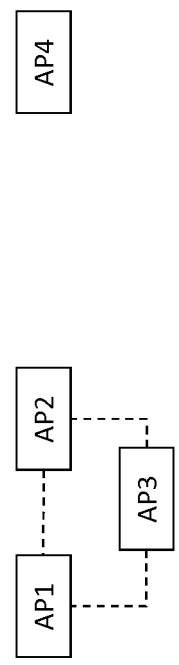
Fig. 2a
Fig. 2b

METHOD FOR EVALUATING LOCATIONS OF WIRELESS ACCESS POINTS IN AN HYBRID NETWORK

This application claims the benefit, under 35 U.S.C, §365 of International Application PCT/EP2011/061548, filed Jul. 7, 2011, which was published in accordance with PCT Article 21(2) on Jan. 12, 2012 in English and which claims the benefit of European patent application No. 10305757.6, filed Jul. 7, 2010.

FIELD OF THE INVENTION

This invention relates to the field of hybrid networks comprising a wired backbone infrastructure set up in a surface-limited area, and wireless access points plugged on said backbone, said access points forming a wireless network covering partially or totally said area. More particularly, the invention relates to a method for evaluating locations of wireless access points in the surface limited area.

BACKGROUND OF THE INVENTION

In the State of the Art, there are hybrid home networks composed of a backbone in wired technology such as PowerLine Communication (also known as "PLC"), Multimedia over Coax Alliance (MoCA®) or Ethernet cabling, on which a number of wireless access points are plugged. The home is therefore covered by an aggregation of small wireless clusters generated by said access points. Any wireless client device, mobile or stationary, hereinafter called "node" located inside said wireless cluster is then able to communicate with the access point which generates it. A node is adapted for sending wireless signals to access points and also to receive wireless signals from access points.

Inside the house perimeter, it is convenient to have a complete wireless coverage inside which a node can communicate to at least one access point. The term "coverage" of an access point $AP_1$ should be understood in conjunction with the physical receiving modes HBR, LBR of said access point $AP_1$ which is representative of a type of modulation used to send and receive the wireless signal. These modulations are more or less robust in function of environment perturbations and more or less efficient in terms of achieved bitrates. Each type of modulation is characterized by a signal to noise ratio level below which the modulation achieves a certain bitrate. Then, the coverage domain corresponding with said receiving modes HBR is usually determined by the locations from which a signal sent by a node is greater than a first level L1, and the coverage domain corresponding with respectively said receiving modes HBR is determined by the locations from which a signal sent by a node is greater than a second level L2 at AP1. For example, the high bitrate is equal to 100 Mbit/s, the low bitrate is equal to 10 Mbit/s and the first level L1 is greater than the second level L2.

As illustrated in FIG. 1a, a hatched zone corresponds to locations from which any node can emit a wireless signal producing at said access point AP1 a Received Signal Strength Indicator (also known as "RSSI") which is greater than the first level L1 and vice-versa the node can receive a wireless signal from the access point $AP_1$ which is greater than its first level L1. On the same figure, the pale grey zone, which naturally comprises the hatched zone; corresponds to locations from where any node can emit a wireless signal producing at said access point $AP_1$ a RSSI greater than the second level L2 and vice-versa.

Usually, the signal power also named later as "signal level" emitted by a node or an access point is constant. A more general case in hybrid network would happen when the emitted signal power varies with time, but in such case it is then assumed that the receiving side (node or access point) is able to determine the power of emitted signal used. As a result, in all case, the receiving side is able to evaluate the link budget from the emitting side, derived from the RSSI plus a correction value. In the following, the RSSI measurement will be considered as an equivalent for an evaluation by the receiving side of the budget of the link emitted side to receiving side.

Typically, the bitrate between said access point AP1 and the (emitting) node is greater than 10 Mbits/s when the latter is located in the pale grey zone and greater than 100 Mbits/s when the latter is located in the hatched zone with a technology such as based on IEEE802.11n. It is easily understood that the high bit rate coverage domain is usually centred on the access point location and is included within a low bit rate coverage domain.

It is a reasonable assumption that if two access points $AP_1$, $AP_2$ are located within their mutual low bit rate coverage domain, their high bit rate coverage are contiguous, as illustrated in FIG. 1b.

In addition, the way the two access points see each other is about the same. The access point $AP_1$ sees the access points $AP_2$ the same way as the access point $AP_2$ sees the access point $AP_1$ when no sophisticated antenna steering or beamforming or separate Tx Rx antenna system is implemented. It is a reasonable assumption that hybrid networks comprise access points having simple antenna system for practical implementation reasons.

Today it is rare to find a hybrid network having a full coverage of the home because it is difficult for an end-user to deploy alone access points in the home for covering the home with such a network and for an access provider to help remotely said end-user in its access points deployment.

One of the goals of the present invention is to propose a method for evaluating an arrangement of access points in a hybrid network whose high bitrate coverage domain of the wireless network covers the home. Said method could contribute for example to assist an end-user to optimize easily the choice of the location of access points in such a way it cooperates efficiently with other access points plugged in the hybrid network. As a target, the end-user wishes to get an arrangement of access points such that the high bitrate coverage domain covers the whole home by using a minimum number of access points.

This assistance could be direct: by providing from a station also plugged on the wired backbone to the end-user simple information on the merits of the present locations of the access points. This assistance could be also indirect: by providing more accurate information on the merits of the present locations of the access points to an external access provider for allowing him to realize a remote diagnosis and to assist remotely said end-user.

This method is advantageous during an initial deployment of a hybrid network, when an end-user is in charge of choosing location of access points in a Home or in case of internal changes (building or removal of wall) in the home after an initial deployment.

SUMMARY OF THE INVENTION

The technical problem that present invention intends to solve is to supply to a end-user in charge of choosing location of access points in a surface-limited area a simple tool or a metrics for evaluating the quality of a current arrangement of access points in the area to cover with the wireless network. This tool relies on data exchanges between the access points of the hybrid networks. The method handles very simple information when the metrics is issued directly to said user, by "simple" one means "easily understandable by the end-user", alternatively the method handles complete information (and presumably more complex to exploit by the end-user) which are addressed first to an access provider which provides then an assistance to the end-user from these complete information.

To this end, the invention relates to a method for evaluating a location of a first wireless access point APi relatively to a location of a plurality second wireless access points APj, said first and second wireless access points APi, APj being connected to a wired backbone BB of an hybrid network HN, said hybrid network HN further comprising:

a station SC being connected to said backbone BB and being configured for communicating with said first and second wireless access points APi, APj via said backbone BB, said station SC being further configured for sending information to a terminal;

wherein the first access point APi being configured for receiving via a wireless interface a wireless signal sent by said second access points APj;

wherein the first access point APi being configured for receiving via a wireless interface a wireless signal sent by said second access points APj;

According to an embodiment, said method involves, at said station SC, steps of:

receiving 1, via said backbone BB from said first access point APi, a level RSSIi,j of a wireless signal received by said first access point APi from said second access point APj ;

processing 100 said received levels RSSIi,j for elaborating a first and a second information I1, I2 for qualifying the location of said first wireless access point APi relatively to the location of said plurality second wireless access points APj;

sending 1000 said first and second information I1, I2 to the terminal.

The invention also relates to a station SC of an hybrid network HN, said hybrid network HN comprising a wired backbone BB set up in an surface-limited area HOM;

a first wireless access points APi and a plurality of second wireless access points APi connected to the backbone BB, the station SC being connected to said backbone BB and being configured for communicating with the first and the second access points APi, APj via said backbone BB, According to an embodiment, said station SC comprises:

Means for processing 100 levels RSSIi,j of wireless signals sent by the first wireless access point APi with a first level L1 and a second level L2 for elaborating a first and a second information I1, I2 on location of the first wireless access point APi in relation with the locations of the plurality of second wireless access points APj;

Means for sending said information I1, I2 to a terminal.

Advantageously, said first information I1 indicates whether the first access point APi receives from said second access point APj a wireless signal whose level RSSIi,j is greater than a first level L1;

said second information I2 indicates whether the first access point APi receives a wireless signal sent directly or following an indirect path from the second access point APj, wherein an indirect path is followed when there is at least one access point APk of said plurality of said second access points, which receives said signal and sends directly or following an indirect path a copy of said signal to said first access point APi, wherein the level RSSIi,j, RSSIi,k, RSSIk,j of received signals is greater than a second level L2.

Advantageously, the elaboration of said first information I1 involves an evaluation of a first connectivity matrix m1 from wireless signal levels RSSIi,j which are greater than said first level L1, wherein said wireless signal is sent directly by said second access point APj to said first access point APi.

The number of first and second wireless access points APi, APj being equal to n, n being an integer greater than 2, i being an index comprised between 1 and n, a second connectivity matrix M2 having a dimension equal to n×n. Advantageously, the elaboration of information I2 involves an evaluation of a second connectivity matrix M2 involving steps of elaborating a direct connectivity matrix m2 from the wireless signal levels RSSIi,j which are greater than said second level L2, said wireless signal is received directly by said first access point APj from said second access point APi;

elaborating indirect connectivity matrixes m2k according to the formula m2k=m2k, where k is an integer comprised between 2 and n-1.

p and q are indexes comprised between 1 and n, an elements $m2_{p,q}$ is located at row p and line q of the direct connectivity matrix m2. Advantageously, the elaboration of the direct connectivity matrix m2 involves a step of thresholding consisting in setting the value of elements $m2_{p,q}$ to 1 when the level $RSSI_{p,q}$ of the signal received by said first access point APp from said second access point APq is greater than the second level L2, and in setting the value of elements $m2_{p,q}$ to 0 in other cases.

Advantageously, elementary product operator and sum operator used for handling elements m2k p,q of indirect connectivity matrix m2k correspond to logical AND operator and logical OR operator respectively.

The number of first and second wireless access points APi, APj is equal to n, n being an integer greater than 2, i is an index comprised between 1 and n, said first connectivity matrix m1 has a dimension equal to n×n, p and q are indexes comprised between 1 and n, an element $m1_{p,q}$ is located at row p and line q of the first connectivity matrix m1. Advantageously, the elaboration of said first connectivity matrix m1 involves a step of threshold element $m1_{p,q}$ consisting in setting the value of element $m1_{p,q}$ to 1 when the level RSSIp,q of the signal received by first access point APp from the second access point APq is greater than the first level L1 and in setting the value of elements $m1_{p,q}$ to 0 in other cases.

Advantageously, said information I2 sent by said station SC is evaluated from second connectivity matrix M2 elaborated without any step of thresholding.

Advantageously, said terminal is adapted for displaying information to an end-user located in said area HOM, and said information I1, I2 is evaluated from the first and second connectivity matrix m1, M2 elaborated with a further step of thresholding.

Advantageously, said first level L1 corresponds to a first receiving level at said first access points APi plus a first margin MH and said second level L2 corresponds to a second receiving wireless level at said first access points APi plus a second margin LH.

The first access points APi operates in compliance with standard 802.11n MIMO with two Spatial Stream. Advantageously, said first receiving level is equal to the sensibility threshold of 64 QAM ¾ mode of said first access point APi and said second receiving level is equal to the sensitivity threshold of QPSK ½ mode of said access point APi.

Said first level L1 defines a first coverage domain centered on the first access point APi location inside which any wireless device can exchange signals with the first access point APi according to a high bitrate HB, said second level L2 defines a second coverage domain centered on the first access point APi location inside which a wireless device can exchange signals with the first access point APi according to a low bitrate LB. Advantageously, said high bitrate HB is greater than or equal to ten low bitrate LB.

Advantageously, said step of sending 1000 information I1, I2 is carried out, at said station SC, in response to a request for information sent by said terminal.

The metrics elaboration mechanism described here above allows deploying the access points in the hybrid network in such a way, that:
  the quality of the wireless cluster aggregation which the end-user can obtain by using this deployment tool is optimized for obtaining a high bitrate coverage domain covering the whole Home by using a minimum number of access points: from the information centralized in the central station SC the access points are positioned in the Home in order to be not too sparse and not uselessly too dense;—the two proposed criteria can be easily expressed into easy-to understand messages for the end user, as an easy deployment system, without any additional information about the home characteristics such as its size, and surrounding materials attenuation characteristics.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiments and execution examples, in no way limitative, with reference to the appended figures on which:

FIG. 2a, represents a first embodiment of an hybrid network with four access points $AP_1$, $AP_2$, $AP_3$, $AP_4$;

FIG. 2b is another representation of situation described in FIG. 2a;

DETAILED DESCRIPTION OF PREFERRED EMBODIMENTS

Figure 1A:
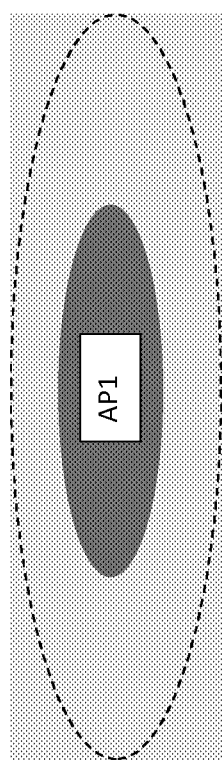
FIG. 1a, illustrates the notion of coverage domain of a wireless access point in relation with physical transmission mode (already described)
Figure 1B:
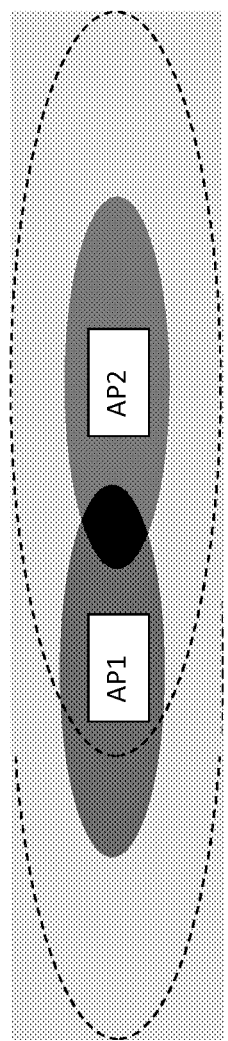
FIG. 1b, represents a situation where two access points are placed within their mutual low bit rate coverage domain (already described)

It is to be understood that the figures and descriptions of the present invention have been simplified to illustrate elements that are relevant for a clear understanding of the present invention, while eliminating, for purposes of clarity, many other elements found in wireless access points and/or in method for deploying access point in hybrid network. However, because such elements are well known in the art, a detailed discussion of such elements is not provided herein. The disclosure herein is directed to all such variations and modifications known to those skilled in the art.

FIG. 2a represents a hybrid network set up in a surface-limited area HOM e.g. an apartment. The hybrid network comprises a wired backbone BB and four access points $AP_1$, $AP_2$, $AP_3$, $AP_4$. Their respective low bitrate coverage domain are indicated by the shaded areas but not the corresponding high bitrate coverage domains.

For the sake of clarity, all the coverage domains of access points $AP_1$, $AP_2$, $AP_3$, $AP_4$ have the same shape but the situation would be the same with coverage domains have different shapes.

When AP, is located inside the low bitrate coverage domain of both $AP_2$ and $AP_3$ the respective high bitrate coverage domains of the three access points $AP_2$, $AP_3$, $AP_4$ are contiguous and can be considered as a whole. That means that a wireless node located inside at least one of the high bitrate coverage domain of $AP_1$, said node is adapted for sending a wireless signal which can be received, at high bitrate, by access points $AP_2$ and $AP_3$ directly.

When no access point is located inside the low bitrate coverage domain of an access point $AP_4$, there is no possibility to establish a wireless communication at high bitrate between a wireless node located inside the high bitrate coverage domain and for example said access point $AP_1$ because when a signal is sent by said node to the access point $AP_4$, said access point AP4 can not forward a copy of said signal to said access point $AP_1$ at high bitrate.

This situation is not convenient when the hybrid network is set up within an apartment, where a node e.g. a mobile device with wireless communication capability depending on its position can (or can not) be connected to all the access points through the wireless mode.

FIG. 2b is a second representation of the situation shown in FIG. 2a. A dashed line binds two access points (e.g. $AP_1$ and $AP_2$) for figuring that said access points are located inside the low bitrate coverage domain of each other. A communication at high bitrate between those two access points AP1, AP2 in possible.

FIGS. 3a to 3e illustrate, according to the representation shown in FIG. 2b, five network configurations where the hybrid network comprises four access points $AP_1$, $AP_2$, $AP_3$, $AP_4$ whose low bitrate coverage domains are partially overlapped. For a node (e.g. a mobile phone with wireless capability) located in the apartment, the most convenient configuration corresponds to a situation where it can access the wireless network from all the locations in the apartment. Then, the configuration depicted in FIG. 3e, if this situation is reachable, is much more advantageous than configuration depicted in FIG. 3a, 3b or 3c.

Figure 3A:
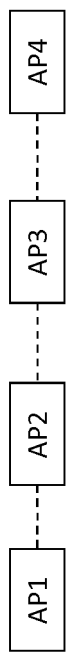
FIGS. 3a to 3e represent schematically five embodiment of an hybrid network with four access points $AP_1$, $AP_2$, $AP_3$, $AP_4$.

FIG. 3a corresponds to a configuration where when the access points $AP_1$ wants to exchange data (or signal) in a wireless mode at a high bitrate with access point $AP_4$ it has to send said data mandatorily in an indirect way, via $AP_2$, then via $AP_3$. In such configuration, even there is one single "extended" high bitrate coverage domain, a signal sent from a wireless node located in the high bitrate coverage domain of access point $AP_4$ directed to access point $AP_1$ would have to follow an indirect path. The wireless signal is sent by the node, received by the access point $AP_4$, and then a copy of said signal is then transmitted step by step in a similar way, from access point $AP_4$ to access point $AP_3$, from access point $AP_3$ to access point $AP_2$, from access point $AP_2$ to access point $AP_1$, . . . .

Figure 3B:
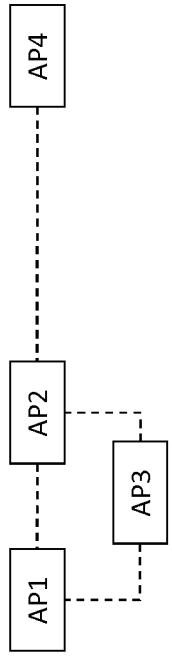
Figure 3C:
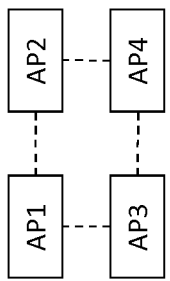
Figure 3D:
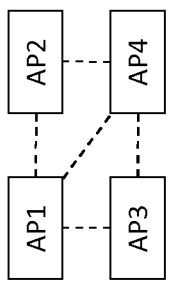

FIG. 3b, corresponds to a configuration where a direct path is available between $AP_1$ and $AP_2$, $AP_1$ and $AP_3$, $AP_2$ and $AP_4$ but no direct path is available between $AP_1$ and $AP_4$ and $AP_2$ and $AP_4$.

When deploying access points for setting up a hybrid network, in other words when a end-user chooses locations in the apartment for plugging access points on the wired backbone of the hybrid network, said end-user has preferably to choose locations where all the access points are located in the low bitrate coverage domain of all other access points of said network. But this situation is not always possible: in this case, the situation depicted on FIG. 3a can be acceptable.

But in any events, the end-user has preferably to choose locations for access points in which they are not isolated.

As the limits of the coverage domain are not directly visible for human being, it is then advantageous for said end-user to have a first metric allowing him to qualify instantaneously the access point location in the apartment HOM.

In particular, these first metric deals with the qualification of relative locations of two access points according to the fact they are located in the respective low bitrate coverage domain of at least one of the access points of the hybrid network.

Figure 3E:
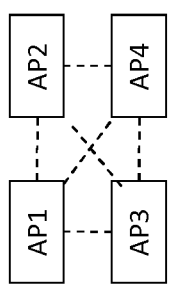

According to such metric, the network configurations where 4 links are shown (FIGS. 3b, and 3c) could be reported as "good", the network configurations where 5 links are shown (FIG. 3d) are could be reported as "very good", and the configuration shown on FIG. 3e could be reported as "excellent".

On the other hand, when two access points $AP_1$, $AP_2$ have closed locations in the area HOM their respective high bitrate coverage domains are largely overlapped. This situation is not desirable because there is no use to locate two access points too close without benefiting any significant increase of the coverage domain.

Then, there is also a need for a second metrics which would inform the user when two access points have too closed location for helping him optimizing the coverage domain.

In particular, this second metrics deals with the qualification of relative locations of two access points according to the fact they are located in the respective high bitrate coverage domain.

As regards the network deployment purpose, on one hand, it is necessary for the wireless clusters to overlap in coverage according to at least to the low bitrate physical mode. On the other hand, it is useless to set up superfluous access points in the area, because of costs. A trade-off has to be found and a simple tool is proposed to the end-user in charge of deploying its home wireless home network.

One solution for elaborating these above-mentioned metrics is to enable the wireless access points $AP_i$ plugged on a wired backbone BB of an hybrid network HN, n being an integer greater than 2, i and j being indexes comprised between 1 and 4, i and j being different, to measure the level $RSSI_{i,j}$ of any wireless signal received by the access point $AP_i$ from the access point $AP_j$ and to send said measured level $RSSI_{i,j}$ through the wired backbone BB to a station SC connected over said backbone.

Said station SC gathers said measured level $RSSI_{i,j}$ and sends a synthesis of said measurements to a user which can be either a provider in charge of an access to the hybrid network either an end-user which is, for example, a person in charge of the placement of said access points in the area HOM. Said end-user can take into account said measured level $RSSI_{i,j}$ for monitoring and optimizing the location of the access points in the area HOM. Said end-user can get information directly from the station SC or indirectly via the access provider.

This capability of the access points is implemented for example into their driver.

The central station SC is adapted for synthesizing for example said measured level $RSSI_{i,j}$ into information I1, I2 usable directly or indirectly by the end-user.

Figure 4:
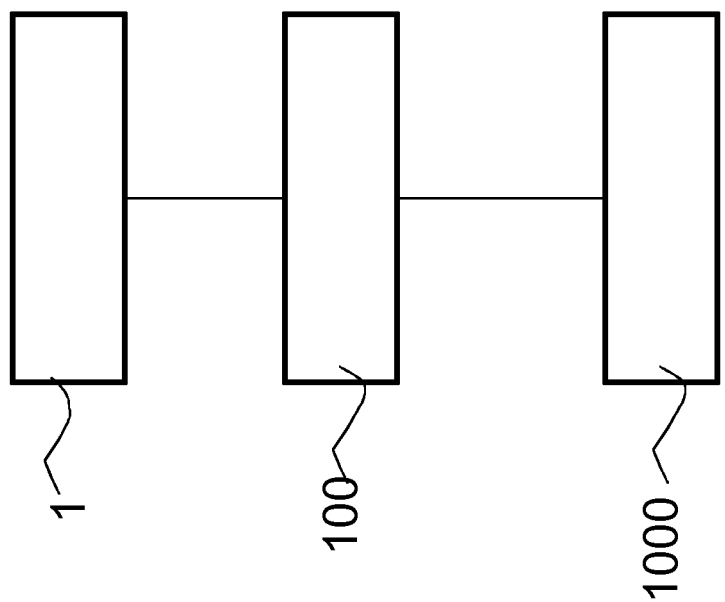
FIG. 4, represents a flow chart of a method for evaluating locations of access points in a hybrid network according to an embodiment.

FIG. 4 shows a flowchart of an embodiment of a method for evaluating locations of access point $AP_i$ in a hybrid network HN as described in FIG. 2a.

An end-user is in charge of choosing locations for said access points $AP_i$ for constituting a complete coverage of the Home. The hybrid networks comprises n=4 access points $AP_i$; where I is an index comprised between 1 and 4.

In a first embodiment, said method comprises three main steps shown on FIG. 4 and described below in detail.

A first step 1 of the method consists in receiving 1, via said backbone BB from said first access point $AP_i$, a level $RSSI_{i,j}$ of a wireless signal received by said first access point $AP_i$ from said second access point $AP_j$ Each access point $AP_i$ measures three levels $RSSI_{i,j}$ of signal. For example, the access point $AP_1$ measures:

$RSSI_{1,2}$ which is the level of the signal sent by access point $AP_2$ received by $AP_1$, $RSSI_{1,3}$ which is the level of the signal sent by access point $AP_3$ received by $AP_1$, $RSSI_{1,4}$ which is the level of the signal sent by access point $AP_4$ received by $AP_1$, A second step 100 consists in processing said received levels RSSIi,j for elaborating a first and a second information I1, I2 for qualifying the location of said first wireless access point APi relatively to the location of said plurality second wireless access points APj;

The station SC operates individual comparison between the levels $RSSI_{i,j}$ and a first level L1 and a second L2.

Implicitly the station SC stores the values of L1 and L2.

For the sake of the clarity, one assumed until now that all access points have identical high and low receiving level and first and second margin MH ML. The elaborations of information I1, I2 are sensibly unchanged if the values of these parameter are proper to the access point. In this last case, the only supplementary constraint is to communicate by each access point at each power-on the individual values L1 L2 of each access point to the station SC.

When the access points $AP_i$ is compliant with standard 802.11n MIMO with two Spatial Stream. According an embodiment, said high receiving level is equal to the sensibility threshold of 64 QAM ¾ mode of said access point $AP_i$ and said low receiving level is equal to the sensitivity threshold of QPSK ½ mode of said access point $AP_i$. The sensitivity threshold corresponds to the signal ration threshold below which the mode in no more operating.

Said first level L1 defines a first (high bitrate) coverage domain centered on the access point $AP_i$ location inside which any wireless device can exchange signals with the access point $AP_i$ according to a high bitrate HB.

Said second level L2 defines a second (low bitrate) coverage domain centered on the access point $AP_i$ location inside which a wireless device can exchange signals with the access point $AP_i$ according to a low bitrate LB.

According an embodiment, a ratio between said high bitrate HB and low bitrate LB is greater than or equal to 10.

According an embodiment, the evaluation of information I1 involves an elaboration of a first connectivity matrix m1 from the levels $RSSI_{i,j}$ of signal greater than said first level L1, said signal is sent directly by said access point $AP_j$ to said access point $AP_i$.

In the current situation, the first connectivity matrix m1 has a dimension equal to 4×4. The first connectivity matrix m1 comprises elements $m1_{p,q}$ located in row p and line q, where p and q are indexes comprised between 1 and 4.

The element $m1_{p,q}$ has a non null value when the access point $AP_q$ is located inside the high bitrate coverage domain of the access point $AP_p$. The value of element $m1_{p,q}$ is representative of the level $RSSI_{i,j}$.

In a preferred embodiment, the elaboration of said first connectivity matrix m1 involves a step of threshold element $m1_{p,q}$ consisting in setting the value of element $m1_{p,q}$ to 1 when the level $RSSI_{p,q}$ of the signal received by access point $AP_p$ directly from the access point $AP_q$ is greater than the first level L1 and to 0 in other cases.

In that case, by identifying the elements $m1_{p,q}$ of said first connectivity matrix m1 being equal to 1, one identifies very easily pairs of access points ($AP_p$, $AP_q$) located too close of each other.

A sending to an user of the elements $m1_{p,q}$ of the matrix m1 provides information I1 for evaluating locations of access points ($AP_p$, $AP_q$).

In particular, when said user is a local end-user he can derive from values non null values of element $m1_{p,q}$ that he could take away the location of said pair of access points $AP_p$ and $AP_q$. This information I1 can also be sent to a provider in charge of the access to the hybrid network enables said provider can then provide a remote assistance to said local end-user in charge of choosing of an optimized location for said access points in the area.

In the current situation, where the hybrid network includes four access points (n=4), the second connectivity matrix M2, has a dimension equal to 4×4. The second connectivity matrix M2 comprises elements $M2_{p,q}$ located in row p and line q, where p and q are indexes comprised between 1 and 4.

In a preferred embodiment, the evaluation of information I2 involves an elaboration of a second connectivity matrix M2 involving steps of elaborating a direct connectivity matrix m2 from the levels $RSSI_{i,j}$ of signal greater than said second level L2, said signal is received directly by said access point $AP_j$ from said access point $AR_i$;

elaborating indirect connectivity matrixes $m2_k$ according to the formula $m2_k = m2^k$, where k is an integer comprised between 2 and n-1.

The direct connectivity matrix m2 comprises elements $m2_{p,q}$ located in row p and line q, where p and q are indexes comprised between 1 and 4.

The value of element $m2_{p,q}$ is set to zero when the access point $AP_q$ is located outside the low bitrate coverage domain of the access point $AP_p$ otherwise it is set to the level $RSSI_{p,q}$.

The second connectivity matrix M2 is equal to $(m2)^{n-1}$.

In a preferred embodiment, the elaboration of the direct connectivity matrix m2 involves a step of threshold consisting in setting the value of elements $m2_{p,q}$ of the direct connectivity matrix m2 to 1 when the level $RSSI_{p,q}$ of the signal received by access point $AP_p$ directly from the access point $AP_q$ is greater than the second level L2, and to 0 in other cases.

In said preferred embodiment, the elementary product operator and sum operator used for handling elements $(m2_k)_{p,q}$ of indirect connectivity matrix $m2_k$ correspond to logical AND operator and logical OR operator respectively.

By identifying a column, e.g. column r, of said second connectivity matrix M2 whose elements are all equal to 0, one identifies an access point ($AP_r$) which is located outside any low bitrate coverage domain of any access point of the network. From this indication, the user can derive he has to close the location of said access point for increasing the total extended low bitrate coverage domain.

A sending to an user of the elements $M2_{p,q}$ of the second connectivity matrix M2 provides information I2 for evaluating relative locations of access points ($AP_p$, $AP_q$).

In particular, said end-user can derive from the identification that the $r^{th}$ column of M2 comprises exclusively elements having a null value, that he has to close the location of said access points $AP_r$. This information can also be sent to a provider in charge of the access to the hybrid network enables said provider to provide a remote assistance to a local user in charge of the choice of the optimized location for said access points in the area.

A third step 1000 consists in sending said information I1, I2 to said user by said station SC for evaluating locations of access points $AP_i$, $AP_j$.

In an embodiment, the station SC is adapted for sending to the user information (I1, I2) on the quality of the locations of wireless access points $AP_i$, $AP_j$ for getting a high bitrate coverage domain of said area HOM. Said station is for example adapted for sending on real-time, for example by showing a simple synthesis of first and second metrics on a display to a end-user located in the area.

When said user is an end-user located in said area (HOM), information (I1, I2) sent by said station (SC) are evaluated from the first and second connectivity matrix (m1, M2) elaborated with a step of threshold.

In addition, when the network constitutes a Local Area Network (LAN) which can be accessed via a gateway also connected to the network, a provider managing access to said LAN may be interested in having some information about how the end-user eventually deployed his network, either in a proactive troubleshoot strategy, or in a reactive troubleshoot method, for example for handling a hotline service. In the first case, the volume of information the operator can get remotely should not be too large.

In another embodiment, the user is a provider in charge of the access to said hybrid network from an external network. In this case, the station SC is adapted for sending to the provider said information I1, I2. Then, said provider carries out a step of formatting said information and a step of sending said formatted information to said an end-user located in said area HOM.

Said information I2 sent by said station SC is evaluated from second connectivity matrix M2 elaborated without any step of threshold. In that case the second connectivity matrix comprises said measured levels $RSSI_{i,j}$.

The reason of the difference of the information sent to the provider or to the user is that it is presumed that said end-user can only handle simple information and is unable to interpret complex information. At the opposite, it is assumed that an access provider has at its disposal means for interpreting complex information.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method for evaluating connectivity in an hybrid network comprising n wireless access points, n being an integer greater than 2, said method comprising:
   elaborating a low bitrate connectivity matrix having a dimension equal to n×n, wherein an element being located at row i and line j of said low bitrate connectivity matrix corresponds to a direct or an indirect path between a first access point i and a second access point j, i and j being indexes comprised between 1 and n, wherein the level of received signals between each access point is greater than a low bitrate level;
   elaborating a high bitrate connectivity matrix having a dimension equal to n×n, wherein an element being located at row i and line j of said high bitrate connectivity matrix corresponds to a direct path between a first access point i and a second access point j, i and j being indexes comprised between 1 and n, and wherein the level of received signals is greater than a high bitrate level;
   evaluating that connectivity of said access points is optimized for high bitrate coverage in said hybrid network by using a minimum number of n access point in the case here a high number of elements of the high bitrate connectivity matrix is null and where a high number of elements of the low bitrate connectivity matrix is non-null.

2. The method according to claim 1 wherein elaborating said high bitrate connectivity matrix further comprises thresholding said high bitrate connectivity matrix by setting an element being located at row i and line j of said high bitrate connectivity matrix to 1 when the level of the signal received by second access point from a first access point is greater than the first level and the value of said element is set to 0 in other cases.

3. The method according to claim 1 wherein elaborating said low bitrate connectivity matrix further comprises
   measuring a level of a wireless signal received by a first access point i from a second access point j;
   elaborating a direct low bitrate connectivity matrix m2 from the wireless signal levels which are greater than said low bitrate level;
   elaborating indirect low bitrate connectivity matrixes according to the formula $m2_k = m2^k$, where k is an integer comprised between 2 and n-1 wherein m2 is said direct low bitrate connectivity matrix and $m2_k$ is an indirect low bitrate connectivity matrix for k.

4. The method according to claim 1 wherein elaborating said low bitrate connectivity matrix further comprises:
   measuring a level of a wireless signal received by a first access point from a second access point;
   elaborating a direct low bitrate connectivity matrix m2 from wireless signal levels which are greater than said low bitrate level;
   elaborating said low bitrate connectivity matrix according to the formula $M2 = m2^n$, where n is an integer representative of the number of wireless access points and m2 is said direct low bitrate connectivity matrix.

5. The method according to claim 3 wherein elaborating said direct low bitrate connectivity matrix further comprises thresholding said direct low bitrate connectivity matrix m2 by setting an element being located at row i and line j of said direct low bitrate connectivity matrix to 1 when the level of the signal received by second access point from a first access point is greater than the low bitrate level and the value of said element is set to 0 in other cases.

6. A control station configured for evaluating connectivity in an hybrid network, said hybrid network comprising said control station and n wireless access points, n being an integer greater than 2, said station comprises at least a processor configured to:
   elaborate a low bitrate connectivity matrix having a dimension equal to n×n, wherein an element being located at row i and line j of said low bitrate connectivity matrix corresponds to a direct or an indirect path between a first access point i and a second access point j, i and j being indexes comprised between 1 and n, wherein the level of received signals is greater than a low bitrate level;
   elaborate a high bitrate connectivity matrix having a dimension equal to n×n, wherein an element being located at row i and line j of said high bitrate connectivity matrix corresponds to a direct path between a first access point i and a second access point j, i and j being indexes comprised between 1 and n, and wherein the level of received signals is greater than a high bitrate level;
   evaluate that connectivity of said access points is optimized for high bitrate coverage in said hybrid network by using a minimum number of n access points in the case where a high number of elements of the high bitrate connectivity matrix are null and where a high number of elements of the low bitrate connectivity matrix is non-null.

7. The control station according to claim 6 wherein said at least a processor is further configured to threshold said high bitrate connectivity matrix by setting an element being located at row i and line j of said high bitrate connectivity matrix to 1 in the case where the level of the signal received by second access point from a first access point is greater than the high bitrate level and the value of said element is set to 0 in other cases.

8. The control station according to claim 6 wherein said at least a processor is further configured to elaborate said low bitrate connectivity matrix by:
   measuring a level of a wireless signal received by a first access point i from a second access point j;
   elaborating a direct low bitrate connectivity matrix m2 from the wireless signal levels which are greater than said low bitrate level;
   elaborating indirect low bitrate connectivity matrixes according to the formula $m2_k = m2^k$, where k is an integer comprised between 2 and n-1 wherein m2 is said direct low bitrate connectivity matrix and $m2_k$ is an indirect low bitrate connectivity matrix for k.

9. The control station according to claim 6 wherein said at least a processor is further configured to elaborate said low bitrate connectivity matrix by:
   measuring a level of a wireless signal received by a first access point from a second access point;
   elaborating a direct low bitrate connectivity matrix m2 the wireless signal levels which are greater than said low bitrate level;
   elaborating said low bitrate connectivity matrix according to the formula $M2 = m2^n$, where n is an integer representative of the number of wireless access points and m2 is said direct low bitrate connectivity matrix.

10. The control station according to claim 8 wherein said at least a processor is further configured to threshold said direct low bitrate connectivity matrix m2 by setting an element being located at row i and line j of said direct low bitrate connectivity matrix m2 to 1 in the case where the level of the signal received by second access point from a first access point is greater than the low bitrate level and the value of said element is set to 0 in other cases.

* * * * *